Sept. 10, 1940.  J. M. WEYDELL  2,214,391
CLUTCH
Filed Aug. 1, 1938
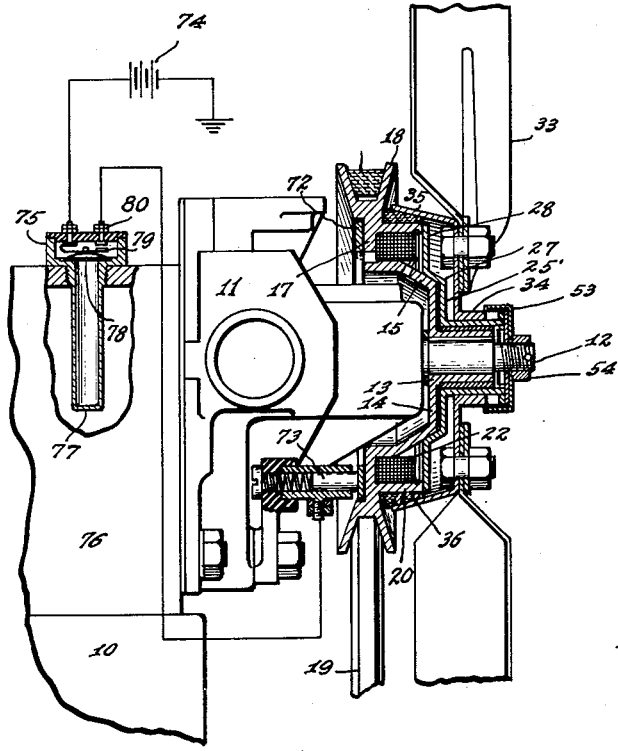
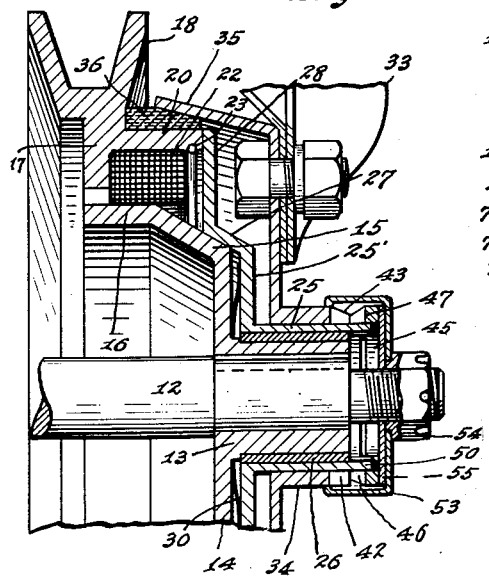
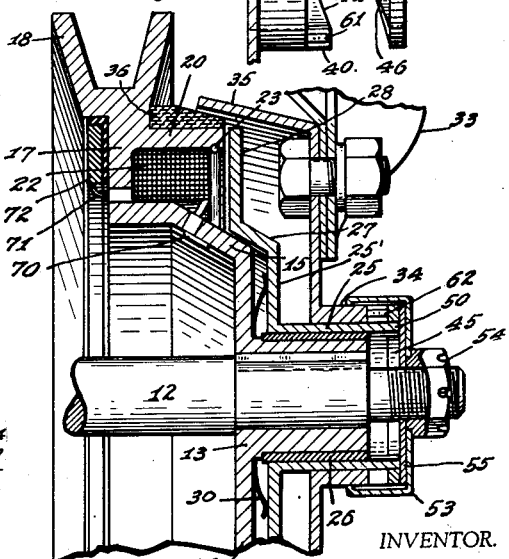
INVENTOR.
JARL M. WEYDELL,
BY
ATTORNEYS.

Patented Sept. 10, 1940

2,214,391

UNITED STATES PATENT OFFICE 2,214,391

CLUTCH

Jarl M. Weydell, Indianapolis, Ind., assignor of one-half to Edward E. Stout, Indianapolis, Ind.

Application August 1, 1938, Serial No. 222,322

6 Claims. (Cl. 192—40)

My invention relates to clutches and has for its primary object the production of a clutch which, with a very small actuating effort, will produce a strong and positive clutching action. More specifically, it is my object to produce an electro-magnetically actuated clutch which will require but a very small amount of current to effect the clutching action. Still another object of my invention is to provide means cushioning the action of such a clutch.

In carrying out my invention I associate an electro-magnet with one of the rotatable elements between which the clutch is to act. The armature of this electro-magnet is in the form of a pilot clutch-member which engages and rotates with the first rotatable element when the electro-magnet is energized. I provide mechanism, preferably cam means, actuated by relative rotation of the pilot clutch-member and the second rotatable element for effecting engagement of a frictional clutch acting directly between the two rotatable elements. This latter mechanism desirably includes a spring or other yielding means which opposes rotation of the pilot clutch-member and the second rotatable element and applies to the latter a gradually increasing torque before the main clutch becomes engaged. This cushioning means may also operate to provide retraction of the mechanism which engages the main clutch.

The accompanying drawing illustrates my invention: Fig. 1 is an axial section through the clutch mechanism as applied between the fan and fan-shaft of an internal combustion engine; Fig. 2 is a fragmental view similar to Fig. 1 but on an enlarged scale, showing the clutch engaged; Fig. 3 is a view similar to Fig. 2, but showing the clutch disengaged; Fig. 4 is a side elevation of the mechanism which actuates the main clutch shown in the condition existing when the main clutch is engaged; Fig. 5 is a view similar to Fig. 4, but showing the condition existing when the main clutch is disengaged; and Fig. 6 is an illustrative view showing in axially separated relation the two principal parts of the mechanism for engaging the main clutch.

In the drawing, my invention is illustrated as applied to control rotation of the fan ordinarily employed in automobiles to draw air through the radiator. It is to be understood, however, that the application of my invention, in its broader aspects, is not limited to this particular situation.

In the device illustrated in the drawing, an internal combustion engine 10 has associated with it a water pump 11 the rotatable element of which is driven by a shaft 12 projecting from the front of the pump casing. Keyed to the projecting end of the shaft 12 there is a pulley-hub 13 having a flange 14 formed with a frustoconical portion 15 and a cylindrical portion 16, both projecting rearwardly. The cylindrical portion 16 of the hub-flange joins the web 17 of a pulley 18 which is grooved peripherally for the reception of a V-belt 19, by which it is driven. The hub 13, the flange-portions 14, 15, and 16, the pulley-web 17, and the pulley proper 18 may all be formed integrally as a casting of magnetic material.

Upon the front face of the pulley-web 17 I provide a forwardly projecting annular flange 20 spaced outwardly from the flange-portion 16 and defining in co-operation therewith an annular groove within which is disposed an electro-magnet winding 22, conveniently held in place by a spring-ring 23 disposed in a groove in the inner face of the flange 20.

Mounted on the hub 13 for rotation and axial sliding movement relative thereto I provide a pilot-clutch member 25. If desired, a bearing-bushing 26 of suitable material may be interposed between the hub 13 and the pilot-clutch member 25. The latter member is formed with a flange 25′ having a frustoconical portion 27 complementary to the portion 15 of the pulley hub and with a plain peripheral portion 28 which overlies the outer end of the winding 22 and also the outer face of the flange 20. The pilot-clutch member, or at least the portions 27 and 28 thereof are of magnetic material, so that when the winding 22 is energized the pilot-clutch member 25 will be drawn rearwardly to effect engagement of the frusto-conical flange-portions 15 and 27 whereby to cause the pilot-clutch member to rotate with the pulley 18. Desirably, a spring 30 or other suitable means is provided resiliently urging the pilot-clutch member 25 forwardly and thereby tending to disengage the flange portions 15 and 27.

The fan 33 is mounted upon a hub 34 rotatably supported upon the hub of the pilot-clutch member 25. The hub 34 is formed with a rearwardly extending frusto-conical clutch flange 35 adapted to engage the correspondingly shaped outer surface of the flange 20 on the pulley 18. The latter flange is desirably faced with suitable friction-clutch material, as indicated at 36. The clutch flange 35 and the facing 36 constitute the main clutch which can be engaged by rearward movement of the fan-hub 34.

The mechanism provided for effecting rearward movement of the fan-hub to cause engagement of the main clutch may take various forms, but I prefer to employ the form illustrated in detail in Figs. 4, 5, and 6. In this arrangement, the fan-hub 34 is provided on its forward end with two forwardly extending projections 40 and 41 shaped to provide diametrically opposite helical cam-surfaces 42 and 43 respectively. The hub 25 of the pilot-clutch member extends forwardly beyond the projections 40 and 41 and carries a collar 45 provided with two rearwardly extending projections 46 and 47 having helical cam-surfaces co-operating respectively with the surfaces 42 and 43. The collar 45 is connected with the clutch-hub 25 for rotation therewith. For this purpose, the front end of the clutch-hub 25 may be provided with two or more forwardly extending tongues 50 which enter slots 51 in the collar 45.

The cam mechanism just described is desirably enclosed within a cup-like housing 53 held on the end of the shaft 12 by a nut 54. A thrust-washer 55 may be interposed between the collar 45 and the cup 53.

Assuming that the pulley 18 rotates in a clockwise direction when viewed from the right in any of the figures of the drawing, the operation of the device will be evident. With the winding 22 de-energized, the spring 30 will force the pilot-clutch member 25 outwardly, so that that member will be disengaged from the hub of the pulley 18. As a result, the pulley 18 can rotate relatively to the pilot-clutch member 25 and to the fan. If the winding 22 is energized, however, the pilot-clutch member 25 will be drawn rearwardly to cause frictional engagement of the flange portions 27 and 15, and the pilot-clutch member will thereafter tend to rotate with the pulley 18. Because of the positive interconnection provided by the tongues 50 and slots 51, the collar 45 will tend to rotate with the pilot-clutch member 25 from its normal position as illustrated in Fig. 5 toward the position illustrated in Fig. 4. By co-operation of the cam surfaces on the projections 40 and 41 and 46 and 47, the fan-hub will be forced rearwardly to cause engagement of the flange 35 with the clutch facing 36 on the pulley 18. Thereafter, the pulley and fan will rotate together.

In the particular mechanism illustrated in the drawing, the fan and its hub are biased forwardly because of air-reaction upon the fan blades. As a result, it is unnecessary in this specific arrangement to provide any means for separating the interengaging faces of the fan hub and pulley when it is desired to disengage the clutch. To prevent any self-locking tendency of the interengaging cam surfaces on the fan-hub 34 and collar 45 from preventing disengagement of the main clutch, I may employ means tending to rotate the fan-hub 34 and collar 45 relatively to each other in a releasing direction. In the device shown in the drawing, such means takes the form of a coiled tension spring 60 one end of which engages a pin 61 on the fan-hub 34 and the other end of which is received in an opening 62 in the projection 47 on the collar 45. This spring tends to move the collar 45 relatively to the fan-hub 34 from the position illustrated in Fig. 4 to the position illustrated in Fig. 5.

When the winding 22 is de-energized, the spring 30 forces the pilot-clutch member 25 forwardly to break the engagement between the flange-portions 27 and 15. This frees the pilot-clutch member and the collar 45 from connection with the pulley 18 and permits the spring 60 to rotate them relatively to the fan-hub 34 to the position illustrated in Fig. 5. Thereupon, the air reaction on the fan-blades 33 moves the fan and fan-hub forwardly to disengage the flange 35 from the clutch-facing 36.

Movement of the fan-hub 34 and the collar 45 under the influence of the spring 60, is desirably limited, as by providing the fan-hub with an abutment 65 which engages the end of the projection 46 on the collar 45. Engagement of the abutment 65 with the projection 46 prevents the fan 33 from overrunning the pilot-clutch member and collar 45 and from thereby buckling the spring 60.

It is to be noted that, upon energization of the winding 22, the resultant relative rotation of the collar 45 and the fan-hub 34 stretches the spring 60. As a result, some driving torque, represented by the reaction of the spring 60 upon the pin 61, is applied to the fan before the clutch 35—36 is engaged. This cushions the shock that would otherwise result from engagement of the clutch 35—36 and tends to eliminate wear.

The means employed for effecting connection of the winding 22 with the source of current used to energize it may take any desired form. As indicated at 70, one terminal of the winding 22 is grounded to the pulley 18, while the other terminal, indicated at 71, is connected to a collector ring 72 mounted upon but insulated from the pulley. Co-operating with the collector ring 72 is a stationary brush 73 spring-pressed against the collector ring and adapted for connection to a source of current, such as the battery 74.

Because of the comparatively small amount of current required to energize the winding 22 sufficiently to cause engagement of the pilot-clutch 15—27, the connection of the winding 22 to the battery 74 may readily be controlled by some means responsive to the temperature of the engine. The temperature responsive means illustrated in Fig. 1 comprises a casing 75 adapted to be mounted upon the outside of the water-jacket 76 of the engine and provided with a hollow extension 77 which projects into the water-jacket. Within the casing 75, the interior of the hollow extension 77 is closed by a flexible diaphragm 78. The diaphragm is operatively connected to a movable contact 79 which co-operates with a fixed contact 80 to control connection of the winding 22 to the battery 74. I have found that a thermostatic switch constructed as described is accurate to temperatures of less than 1° F. with the interior of the casing-extension 77 filled with air.

I claim as my invention:

1. In combination, a rotatable element, a main clutch member and a pilot-clutch member coaxial with said rotatable element, said two clutch members being independently movable in the same axial direction into clutching engagement with said rotatable element, a clutch-actuating member rigid with said main clutch member, a second clutch-actuating member rotatable with said pilot-clutch member, means for transmitting axial thrust between said second clutch-actuating member and said rotatable element, said two clutch-actuating members having engageable helical cam surfaces operative upon relative rotation of the clutch-actuating members to force said main clutch member into clutching engagement with said rotatable element, and releasable means for moving said pilot-clutch member into clutching engagement with said rotatable element.

2. In combination, a rotatable element, a main clutch member and a pilot-clutch member coaxial with said rotatable element, said two clutch members being independently movable in the same axial direction into frictional clutching engagement with said rotatable element, a clutch-actuating member rigid with said main clutch member, a second clutch-actuating member rotatable with said pilot-clutch member, means for transmitting axial thrust directly between said second clutch-actuating member and said rotatable element, said two clutch-actuating members having co-operating provisions operative upon relative rotation of the clutch-actuating members to force said main clutch member into clutching engagement with said rotatable element, and releasable means for moving said pilot-clutch member into clutching engagement with said rotatable element.

3. In combination, a rotatable element, a main clutch member and a pilot-clutch member coaxial with said rotatable element, said two clutch members being independently movable in the same axial direction into frictional clutching engagement with said rotatable element and disposed within said main clutch member, means acting between said rotatable element and said main clutch member and operative upon relative rotation of said main and pilot-clutch members for moving said main clutch member into clutching engagement with said rotatable element, and releasable means for moving said pilot-clutch member into clutching engagement with said rotatable element.

4. In combination, a rotatable shaft, an element rigid with said shaft and having two annular clutch surfaces on one side, an abutment on said shaft spaced axially from said clutch surfaces, a main clutch member and a pilot-clutch member disposed between said abutment and said element, said two clutch members being rotatable relatively to each other and to said shaft and being independently axially movable into clutching engagement with the respective clutch surfaces on said element, means reacting axially against said abutment and operative upon relative rotation of said two clutch elements for moving said main clutch element into clutching engagement with said element, and releasable means for moving said pilot-clutch member into clutching engagement with said element.

5. In combination, a rotatable element, a main clutch member, and a pilot-clutch member, all relatively rotatable, clutch-actuating means disposed on one side of said main clutch member, said rotatable element being provided on the other side of said main clutch member with annular clutch surfaces engageable respectively by said two clutch members, said clutch-actuating means reacting against said rotatable element and operating upon relative rotation of said two clutch members to move said main clutch member into clutching engagement with said rotatable element, and releasable means for moving said pilot-clutch member into clutching engagement with said rotatable element.

6. In combination, a rotatable element, means for rotating said element in one direction, a main clutch member and a pilot-clutch member rotatable relatively to each other and to said rotatable element and independently movable axially into clutching engagement with said rotatable element, a fan rigid with said main clutch element and having blades so inclined that the air-reaction thereagainst tends to move said main clutch member out of engagement with said rotatable element, clutch-actuating means operative upon relative rotation of said two clutch members to move said main clutch member into clutching engagement with said rotatable element, and releasable means for moving said pilot-clutch member into clutching engagement with said rotatable element.

JARL M. WEYDELL.